United States Patent [19]
Matsuda

[11] 4,288,152
[45] Sep. 8, 1981

[54] AUTOMATIC RANGE FINDER SYSTEM

[75] Inventor: Motonobu Matsuda, Kawachinagano, Japan

[73] Assignee: Minolta Camera Kabushiki Kaisha, Osaka, Japan

[21] Appl. No.: 176,635

[22] Filed: Aug. 8, 1980

[30] Foreign Application Priority Data

Aug. 16, 1979 [JP] Japan .................................. 54-104796
Aug. 16, 1979 [JP] Japan .................................. 54-104797
Aug. 16, 1979 [JP] Japan .................................. 54-104798

[51] Int. Cl.³ .......................... G03B 7/08; G01J 1/20
[52] U.S. Cl. ....................................... 354/25; 354/163; 354/195; 250/201
[58] Field of Search .......................... 354/25, 163, 195; 352/140; 250/201, 204; 356/1, 4

[56] References Cited

U.S. PATENT DOCUMENTS

| | | | |
|---|---|---|---|
| 3,443,502 | 5/1969 | Harvey | 354/25 |
| 3,723,003 | 3/1973 | Vockennuber et al. | 354/163 |
| 3,759,614 | 9/1973 | Harvey | 354/163 |
| 4,065,778 | 12/1977 | Harvey | 354/25 |
| 4,206,990 | 6/1980 | Imura et al. | 354/25 |
| 4,251,144 | 2/1981 | Matsuda et al. | 354/25 |

*Primary Examiner*—Russell E. Adams
*Attorney, Agent, or Firm*—Wenderoth, Lind & Ponack

[57] ABSTRACT

An automatic range finder system for use, for example, in an automatic focusing camera or the like which includes a light beam projection unit, a light receiving unit employing a plurality of photoelectric or photosensitive elements, current output circuitry for developing current corresponding to the light beam incident upon one or the plurality of the photoelectric elements, current-voltage conversion circuitry for converting the current outputs into voltage signals, voltage comparison circuitry for comparing the magnitude of the output voltage of the current-voltage conversion circuitry with comparison reference signals. For the comparison reference voltage of the voltage comparison circuitry, voltage varying according to the voltage signal which contains the largest amount of the light beam component is employed, while the output of the voltage comparison circuitry is utilized for focusing of a photographic lens as a distance information.

36 Claims, 17 Drawing Figures

Fig. 10
| 21 | 1 | 1 | 0 | 1 | 0 | 0 | 0 | 0 | 0 | 0 |
|---|---|---|---|---|---|---|---|---|---|---|
| 22 | 0 | 1 | 1 | 1 | 1 | 0 | 1 | 0 | 0 | 0 |
| 23 | 0 | 0 | 0 | 1 | 1 | 1 | 1 | 1 | 0 | 0 |
| 24 | 0 | 0 | 0 | 0 | 0 | 0 | 1 | 1 | 1 | 0 |
| 87 | 1 | 1 | 1 | 1 | 1 | 1 | 1 | 1 | 1 | 1 |
| Decoder output | 90 | 91 | 92 | 92 | 93 | 94 | 94 | 95 | 96 | 97 |
Short distance ← → Long distance
Fig. 11
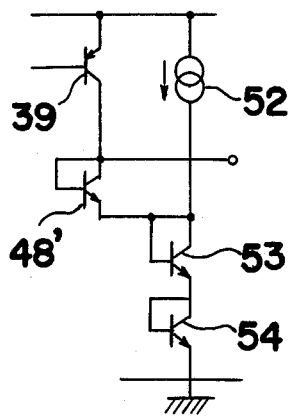
Fig. 12
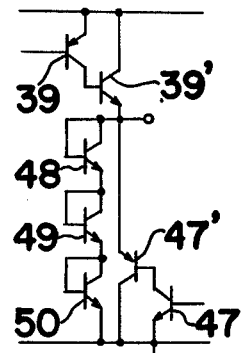
Fig. 14
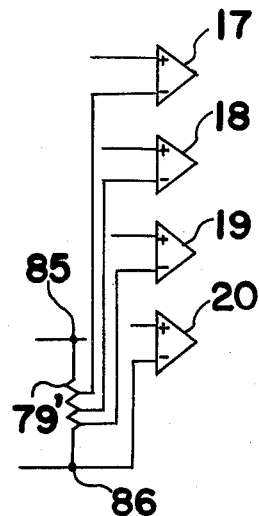
Fig. 13
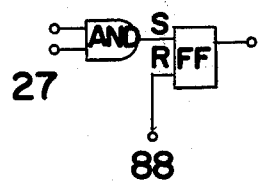
Fig. 15
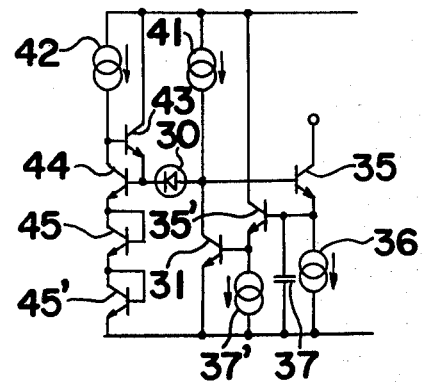

AUTOMATIC RANGE FINDER SYSTEM

BACKGROUND OF THE INVENTION

The present invention regenerally relates to a range finder system and more particularly, to an automatic range finder system suitable for use, for example, in an automatic focusing camera and capable of automatically determining a distance between the camera and a subject to be photographed for focusing. The range finder based on triangular principles includes light emitting means for emitting a light beam toward the subject and an optical system disposed in a position spaced a predetermined base length from the light emitting means, with a plurality of photoelectric or photosensitive elements being provided at an image forming area of the optical system so that reflection of the light beam from the subject is received by the photoelectric elements corresponding to the distance between the camera and the subject to be photographed.

The range finder of the above described type is disclosed, for example, in U.S. Pat. No. 3,723,003, in which, however, construction and function are described only in terms of principles, and no particular techniques that will make it possible to incorporate the range finder into a compact camera for commercial success are disclosed, thus said prior art being too academic to be put into actual application.

Upon investigations into the matter to provide a range finder suited to practical application, the present inventors have obtained findings as follows.

There has been a strong demand for a range finder which can be readily built into 35 mm lens shutter cameras, 110 pocket cameras, movie cameras, etc. without large alterations in size of such cameras, and in the efforts for realizing such a range finder as described above, many new problems have been presented to be solved. Main items required for the range finder of the above described type are, for example, compact size, high reliability, small power consumption, low price, etc.

Incidentally, for enabling the range finder to be incorporated into a compact-size camera, the base length of the range finder is restricted within several cm, and correspondingly, the pitch for arrangement of the plurality of photoelectric elements to be included in the photoresponsive means is also limited within a predetermined value according to the geometric and optical construction of the range finder system. For example, in a range finder system in which the range of distance from 1 m to 5 m between the camera and the subject to be photographed is covered by four photoelectric elements, the pitch between the respective photoelectric elements becomes approximately $130\mu$ when the base length is set to be 25 mm, with the width of each photoelectric element being smaller than the above value. Accordingly, if it is intended to limit the size of an image formed at the photoresponsive means by reflection of the light beam from the subject, so as not to exceed the width of one photoelectric element, it is required that the light emitting area of a light emitting element included in the light emitting means is reduced as small as possible, and that the lenses employed for the optical system included in the light emitting means and photoresponsive means should have an extremely small aberration. However, such lenses as described above are generally expensive, and even when lenses with ideal properties are employed, there still remain some problems as described later. On the other hand, in a simple optical system employing, for example, one plastic lens, the aberration is hard to avoid, and even if the light emitting area of the light emitting element is reduced as far as practicable, the size of the image formed by the reflection of the light beam from the subject undesirably exceeds the size to be determined geometrically and optically, thus covering two or more photoelectric elements. In connection with the above, if it is attempted to avoid the image formation extending over the plurality of photoelectric elements by increasing the pitch for the arrangement of the photoelectric elements, the base length has to be undesirably increased, thus going against the intention for the compact size. Meanwhile, it is quite common that subjects lit by surrounding light such as a person brightly illuminated by sunlight, etc. are photographed, and thus, photoelectric elements of the range finder are subjected to incidence of surrounding light apart from the reflection of the light beam, i.e. signal light. As one method for efficiently separating the signal light component mixed with the surrounding light, it is conceived to set the intensity of the light beam emitted from the light emitting means to be also large, but such a practice results in the increase of power consumption and the light emitting area of the light emitting element, and is not suitable for the intended range finder system in which a narrow light beam is required.

SUMMARY OF THE INVENTION

Accordingly, an essential object of the present invention is to provide a range finder system of a small size which can be readily incorporated particularly into compact cameras of various types Another important object of the present invention is to provide a range finder system of the above described type which can be produced at low cost, and presents an automatic focusing camera suitable as a commercial product, when incorporated in such a camera.

A further object of the present invention is to provide a range finder system of the above described type which has a small power consumption, consequently not requiring a battery of a large capacity.

A still further object of the present invention is to provide a range finder system of the above described type which requires no movable parts, and yet, provides a high reliability.

Another object of the present invention is to provide a range finder system of the above described type which is capable of determining distances with respect to various sybjects to be photographed by successfully detecting the signal light component simultaneously present with the surrounding light.

A still another object of the present invention is to provide a range finder system of the above described type in which a less expensive optical system of plastic lens or the like with a possible aberration may be advantageously utilized.

A further object of the present invention is to provide a range finder system of the above described type which is capable of detecting various subjects with different reflecting rates and distances, at high accuracy through employment of logarithmic compression technique.

In accomplishing these and other objects, the problems inherent in the conventional range finders have been dealt with as follows in the present invention.

The reduction of the size of a range finder, if the base length thereof is set, for example, at 25 mm, with the optical systems to be employed for the light emitting means and photoresponsive means being each formed by one less expensive plastic lens or the like, aberration arising from such lenses is inevitable, while the image to be formed by the signal light extends over two or more photoelectric elements. In the range finder system according to the present invention, the state as described above is accepted as it is, and since intensities of signal light incident upon the respective photoelectric elements are different from each other as mentioned later even when the plurality of photoelectric elements simultaneously receive the signal light, it has been made possible to determine the distances corresponding to the subject through utilization of the above difference as a significant information.

According to one preferred embodiment of the present invention, there is provided an automatic range finder system which comprises light beam projection means for projecting light beam toward a subject to be measured for distance, an image forming optical system disposed at a position spaced a predetermined base length from said light beam projection means in such a manner that the optical axis of said optical system is selectively in parallel to or approximately parallel to an optical axis of said light beam projecting means, a plurality of photoelectric or photosensitive elements so arranged, on an image forming surface of said image forming optical system, as to receive the light beam selectively reflected from the subject according to distances up to said subject, current output circuit means for developing current corresponding to the reflected light of the light beam selectively incident upon one or the plurality of said photoelectric elements, photoelectric conversion circuit means or current-voltage conversion circuit means for converting photoelectric outputs or output current of said current output circuit means into voltage signals corresponding thereto, and voltage comparison circuit means for comparing output voltages of said photoelectric conversion circuit means with reference voltages, said range finder system further including reference voltage varying circuit means arranged to alter the level of said reference voltages according to the output voltage containing maximum amount of signal corresponding to the light beam of the output of said photoelectric conversion circuit means.

By the arrangement according to the present invention as described above, even when the reflection of the light beam is simultaneously incident upon the plurality of photoelectric elements, the output from the photoelectric conversion circuit means or current-voltage converting means is separated into the significant and insignificant signals without any confusion, and thus, the distance detecting function as in an ideal system employing an optical system without aberration can be achieved.

BRIEF DESCRIPTION OF THE DRAWINGS

These and other objects and features of the present invention will become apparent from the following description taken in conjunction with the preferred embodiment thereof with reference to the accompanying drawings, in which:

FIG. 10 is a diagram explanatory of the output signal of a decoder employed in the arrangement of FIG. 9, FIGS. 11 and 12 are fragmentary circuit diagrams each showing a modification of part of the circuit of FIG. 5, FIGS. 13 and 14 are fragmentary circuit diagrams each showing a modification of part of the circuit of FIG. 9, and FIG. 15 is a fragmentary circuit diagram showing a further modification of part of the circuit of FIG. 5.

Before the description of the present invention proceeds, it is to be noted that like parts are designated by like reference numerals throughout several views of the accompanying drawings.

DETAILED DESCRIPTION OF THE INVENTION

Figure 1:
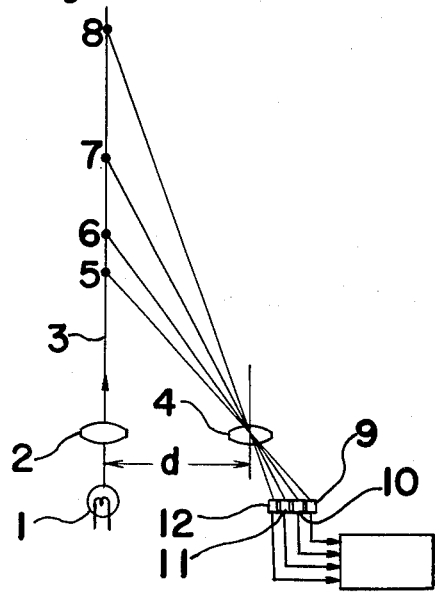
FIG. 1 is a schematic diagram explanatory of principles of triangular distance measurement.
Figure 2:
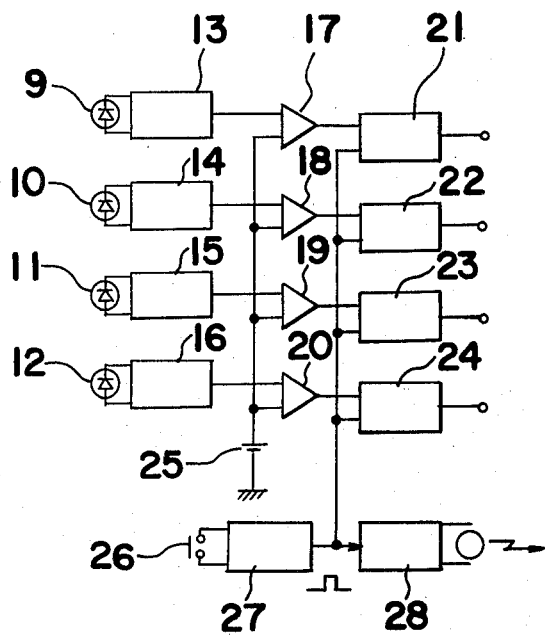
FIG. 2 is an electrical block diagram showing a conventional circuit construction for dealing with the output signal of photoelectric or photosensitive elements of FIG. 1.

Referring to FIGS. 1 and 2, there are schematically shown the principle and structure of a range finder of light beam projection type based on triangular principles, and suitable for use in an automatic focusing arrangement of a camera. In FIG. 1, light emitted from a light source 1 is narrowed down into the form of a beam by a condenser lens 2 so as to be projected toward a point 5, 6, 7 or 8 located on an optical axis 3 of the lens 2. Meanwhile, in a position spaced a base length d from the optical axis 3 of the condenser lens 2, an image forming lens 4 is provided, while a plurality of photoelectric elements 9, 10, 11 and 12 are aligned on an image forming surface of said image forming lens 4. On the assumption that images of objects located at the points 5, 6, 7 and 8 are arranged to be respectively formed on the light receiving surfaces of the photoelectric elements 9, 10, 11 and 12, if the object is positioned at the point 5, 6, 7 or 8, the light emitted by the light source 1 is reflected by the object for incidence upon the corresponding one of the photoelectric elements 9, 10, 11 and 12. Such light incident upon the photoelectric element will be referred to as signal light hereinbelow for differentiation thereof from surrounding light, i.e. standing or steady light such as sunlight.

Accordingly, if the particular one of the photoelectric elements 9, 10, 11 and 12 upon which the signal light is incident is detected, the distance to the object may be found out.

Meanwhile, in FIG. 2 showing an electrical circuit dealing with the output signal from the photoelectric or photosensitive elements, the respective photoelectric elements 9, 10, 11 and 12 are connected to photoelectric conversion circuits 13, 14, 15 and 16 which convert the output photoelectric currents into voltage signals, while the output terminals of the photoelectric conversion circuits 13, 14, 15 and 16 are respectively coupled to one input side of each of voltage comparison circuits 17, 18, 19 and 20. The other input terminals of the respective voltage comparison circuits 17, 18, 19 and 20 are connected to a constant reference voltage source 25 for being applied with the reference voltage for comparison. The output terminals of the respective voltage comparison circuits 17, 18, 19 and 20 are further coupled to the input terminals of registers 21,22,23 and 24, while the clock inputs of the registers 21, 22, 23 and 24 are coupled to the output of a one shot multivibrator 27 further connected to a light source driving circuit 28 which drives for illumination, the light source 1 for a predetermined period of time in response to output pulses of the one shot multivibrator 27. In the above arrangement, when a switch 26 for the one shot multivibrator 27 is closed based on the distance measuring instruction, pulses at "high" level are produced for a predetermined period of time from the one shot multivibrator 27, in response to which light beam is projected onto the subject to be measured for the distance. Accordingly, voltage signal corresponding to the intensities of the signal light is developed from the photoelectric conversion circuits connected with the photoelectric elements which has received the signal light resulting from the reflection of the light beam, and when the level of the voltage signal exceeds the voltage level of the voltage source 25, voltage signal at "high" level is produced from the voltage comparison circuit under said signal system so as to be memorized by the register.

As is seen from the foregoing description, although the light beam projection type range finder of this kind has a simple construction in principle for simplified function, it has not yet been actually incorporated into a camera up to the present to provide a commercial product suitable for practical application. One of the causes obstructing the practical application of the range finder as described above is considered to be attributable to the fact that it has been extremely difficult to effectively separate the signal light component for detection due to very low intensities of signal light incident upon the respective photoelectric elements in addition to simultaneous incidence of standing light such as sunlight, etc. upon said photoelectric elements.

In the present invention, it is intended to bring the range finder of the above described type into practical use through introduction of a new circuit technique by solving the problem of how to effectively separate and detect the very weak light signal component simultaneously present together with the standing light, which has been considered difficult to be solved up to the present. More specifically, for bringing the range finder of the above described type into actual application, the points as follows must be taken into account. That is to say, the range finder of light beam projection type should be small both in size and power consumption, and further, be manufactured at low cost. In order to satisfy such requirements, many conflicting problems are to be encountered. For example, if the intensity of light emitted by the light source is increased for facilitating the detection of the signal light, the power consumption and also the size of the range finder are undesirably made large. On the contrary, when the base length d is reduced for the reduction of size, the accuracy of the optical system must be further improved, thus resulting in an increase of manufacturing cost.

Meanwhile, in the range of the above described type, there is some restriction which is inevitably set from the aspect of geometrical optics, and which will be made clear by a simple calculation as follows.

In the construction of FIG. 1, for example, if the distances from the lens 2 to the points 5 and 8 are set to be 1 m and 5 m respectively, with the base length d being set to be 25 mm and focal length of the lens 4, 20 mm, the distance between the photoelectric elements 9 and 12 becomes 400$\mu$. Accordingly, the pitch for arranging the respective photoelectric elements is about 130$\mu$, if they are arranged at equal intervals. Incidentally, an image of about 130$\mu$ in size at the image forming surface of the lens 4 is equivalent to a light source of about 7 mm in size in the position of the point 5 at a distance of, for example, 1 m. The above fact means that the width of a cross section of the light beam projected toward the object must be less than 7 mm at the position of the point 5. If the cross sectional width of the light beam exceeds the above value, the signal light is unnecessarily incident upon the neighboring photoelectric elements. Such being the case, in the range finder system as described above, it is required to form a very narrow light beam.

Figure 3:
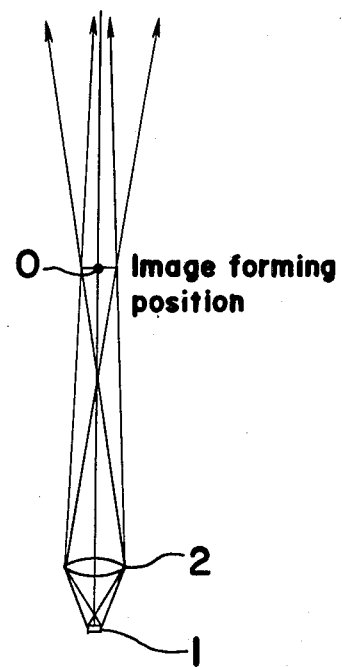
FIG. 3 is a schematic diagram explanatory of the function of a condenser lens.

Referring to FIG. 3, on the assumption that the light beam is constituted by arranging the image of the light source 1 with a predetermined light emitting face to be formed at a limited distance through employment of the condenser lens 2, if the distance between the light source 1 and lens 2 is set to be 20 mm, with the distance from the lens 2 to the image forming point set to be 2 m, the image at this point with respect to the light source 1 has a size enlarged by 100 times, and in order to make the cross sectional width of the light beam at this point less than 10 mm, the width of the light emitting face of the light source 1 should be set less than 100$\mu$. It is also seen from FIG. 3 that, after passing the image forming point 0 of the condenser lens 2, the light beam tends to be spread, with the cross section thereof being gradually increased. Accordingly, in the case where a narrow light beam is to be formed by the use of the condenser lens 2, the light emitting area of the light source 1 must be made so small as to be close to a point light source. For meeting such a requirement for a light source having an extremely small light emitting area, a light emitting diode may normally be raised as most promising. However, in the case where the light emitting diode is to be used for the light source 1, it is very difficult to increase the intensity of light to be emitted thereby to a large extent as compared with the standing light owing to structural limitation of the light emitting diode, and thus, a bright signal light can not be expected therefrom.

Accordingly, in one preferred embodiment of the present invention, it is so arranged that, with particular attention directed to the fact that the brightness of the signal light simultaneously incident upon a plurality of photoelectric elements and noticed on the surfaces of the respective photoelectric elements is the maximum at the central portion of the light incidence and gradually decreases toward the peripheral portions, the significant signal light is to be discriminated from the insignificant signal light. More specifically, it is intended to detect the significant signal light by arranging to vary the comparison level of the voltage comparator circuits 17, 18, 19 and 20 according to the photoelectric conversion outputs of the photoelectric conversion circuit including the photoelectric element which has received the brightest signal light.

Moreover, in the conventional range finders as described earlier, the signal light with respect to a subject to be measured for distance located at a specific distance, for example, to the object located at the position 7 in FIG. 1, should be incident only upon a particular photoelectric element, for example, the photoelectric element 10 in principle, but owing to the difficulty in realizing an ideally narrow light beam as mentioned later, such signal light is undesirably incident upon the photoelectric elements 9, 11 and 12 other than the photoelectric element 10 simultaneously. However, if the light beam is narrowed as far as practicable, it is possible to form a state in which the brightness of the signal light incident upon a plurality of photoelectric elements becomes the maximum at the central portion of the light incidence, with gradual reduction toward the peripheral portions so as to avoid uniform distribution of the brightness over the surfaces of the respective photoelectric elements as mentioned earlier. When there is a difference in the brightness of the signal light incident upon the respective photoelectric elements, significant signals can be chosen therefrom. On the other hand, however, the brightness of the signal light itself varies over a wide range according to the distances up to the objects to be measured and reflectances thereof, and the ratio of the minimum brightness to the maximum brightness of the detectable signal light amounts to more than 2000 times.

Therefore, in another embodiment of the present invention, it is intended to provide an improved range finder which is suitable for practical application and capable of operating under a low voltage source by such an arrangement wherein the signal light incident upon the photoelectric element in the state superposed with the standing light is separated for detection as a current signal corresponding only to the brightness of the signal light and irrelevant to the brightness of the standing light, and the current signal thus obtained is converted into a voltage subjected to logarithmic compression so as to provide a range finder system capable of being operated even under a low voltage source.

The present invention is also characterized in that, for detecting the signal light whose intensity is extremely low even as compared with the standing light as in the case where the light emitting diode is employed for the light source 1, there are provided, in the photoelectric conversion circuit including the photoelectric elements, a current control circuit which allows to pass only light or photoelectric current corresponding to the standing current comparatively slow in the variation with respect to time, and a current circuit which accepts an increased photoelectric current component for the increase of the photoelectric current having considerably rapid variation with respect to time so as to provide a momentary light detection circuit arranged to take out the signal corresponding to the brightness of the signal light without being affected by the intensity of the standing light.

In a further embodiment of the present invention, there is provided a momentary light intensity detection circuit which includes a photoelectric element, a current control element connected in series with said photoelectric element, a buffer circuit whose input is connected to a junction of said photoelectric element and current control element, and whose output is coupled to a control electrode of said current control element, a first capacitor connected to said buffer circuit so as to maintain the control voltage to be applied to the control electrode of said current control element, and an input transistor in which the photoelectric current produced according to momentary pulse light incident upon said photoelectric element in addition to the standing light is caused to flow into its base connected to said junction so as to develop from its collector, current corresponding to said photoelectric current.

Referring now to FIGS. 4 to 14, the present invention will be described in detail hereinbelow.

Figure 4:
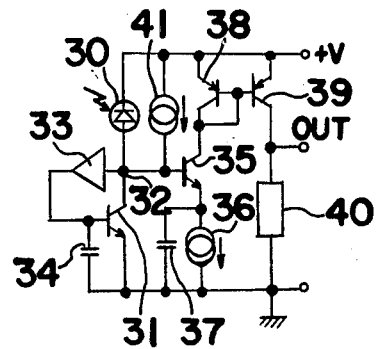
FIG. 4 is an electrical circuit diagram for photoelectric conversion to be employed in a range finder system according to the present invention.

In FIG. 4 showing the construction of the photoelectric conversion circuit in its principle, there is provided a first current circuit which includes a transistor 31 whose collector is connected to the anode of a photoelectric element 30, a buffer circuit 33 connected, at its input, to a junction 32 of the transistor 31 and the photoelectric element 30, and at its output, to the base of the transistor 31, and a capacitor 34 for delay purpose connected between the base and emitter of the transistor 31, with the transistor 31 being controlled so as to cause the photoelectric light current corresponding to light steadily incident upon the photoelectric element, to flow as the collector current. The circuit constituting a second current circuit which is connected between the junction 32 and a constant current source 36 through the base and emitter of the transistor 35 is arranged to receive photoelectric current corresponding to light incident upon the photoelectric element 30 in the form of impulse in addition to the standing light. The constant current source 36 is provided to maintain the collector current of the transistor 35 at the value of the constant current regardless of the magnitude of the photoelectric current due to the standing light in the case where only the standing light is incident upon the photoelectric element 30, while a capacitor 37 connected in parallel with the constant current source 36 suppresses a rapid variation of the emitter potential of the transistor 35. Transistors 38 and 39 whose bases are connected to each other to constitute a current-mirror circuit and coupled to the collector of the transistor 35 develops a current similar to the collector current of the transistor 35 from the collector of the transistor 39 which is connected to a load 40 for deriving the signal subjected to the photoelectric conversion. The base of the transistor 35 is further connected to another constant current source 41 which supplies a dummy current acting as a photoelectric current corresponding to the standing light of specific intensity in the case where there exists no light incident upon the photoelectric element 30. More specifically, the constant current source 41 is not directly related to the detecting function of the signal light, but assists in the function of the circuit so as to maintain the transistors 31 and 35 in a steady state even in the absence of the standing light.

By the above arrangement, in the first place, the function of the first current circuit including the transistor 31 is considered, with the collector of the transistor 31 and the base of the transistor 35 separated and with the constant current source 41 excluded. On the assumption that only light of constant intensity without variation with respect to time is incident upon the photoelectric element 30, the photoelectric or light current corresponding to the incident light at this time flows in the form of the collector current of the transistor 31, because the collector of the transistor 31 is in the state subjected to a negative feedback through the buffer circuit 33 and the base of the transistor 31 comes to be biased by a voltage necessary for converting the photoelectric current into the collector current. On the other hand, in the case where only the standing light is incident upon the photoelectric element 30, the capacitor 34 is merely charged up to the bias voltage as described above, without contributing to the functioning of the circuit. Here, the case where the light in the form of impulse enters the photoelectric element 30 in addition to the standing light will be considered hereinbelow. The rising of such light in the impulse form is assumed to be sufficiently fast as compared with the time constant of a time circuit including the output resistance of the buffer circuit 33 and the capacitor 34 whose signal delay function is utilized. With respect to the incidence of the impulse light as described above, in a time region shorter than its time constant, the base of the transistor 31 is maintained at the bias voltage corresponding to the light current due to the standing light prior to the incidence of the impulse light. Therefore, in the period as described above, since the transistor 31 is still in the state capable of causing only the photoelectric current due to the standing light to flow, said transistor 31 is to show an extremely high resistance by its collector characteristics against the photoelectric current component increasing by the incidence of the impulse light. The behavior of the first current circuit including the transistor 31 as described above is observed over a wide range of intensity region of the standing light.

Still referring to FIG. 4, the detecting function of the photoelectric current corresponding to the impulse light will subsequently be described. In the steady state where only the standing light enters the photoelectric element 30, the constant current by the constant current source 36 is caused to flow through the transistors 35 and 38. Although the transistor 35 of course requires base current, part of the photoelectric current is employed for the base current. Even in the case where photoelectric current is not produced due to absence of the standing light, the base current for the transistor 35 is guaranteed by the dummy current of the constant current source 41. In the steady state, the transistor 35 continues to cause a constant current required by the constant current source 36 to flow irrespective of the intensity of the standing light. Subsequently, when the impulse light is incident upon the photoelectric element 30 to develop photoelectric current corresponding to this impulse light, the transistor 31 shows an extremely high resistance against such current increase portion as described earlier to prevent it from passing. Accordingly, the collector potential of the transistor 31 is raised, and the increased portion of the photoelectric current flows into the base of the transistor 35. The base current corresponding to the increased portion is amplified by the transistor 35 so as to be developed as the collector current thereof. As is seen from the above description, the photoelectric current corresponding to the impulse light is taken out as the amplified collector current in the transistor 35 causing the constant collector current to flow regardless of the intensity of the standing light during the steady state. It is to be noted that in the above functioning, the capacitor 37 functions to maintain the voltage across the terminals constant in the similar manner as in the capacitor 34. By the above function, the increased photoelectric current is allowed to flow into the base of the transistor 35 as the base current. Incidentally, the amplified photoelectric current may be converted into a voltage signal by connecting a load to the collector of the transistor 35. The transistor 31 as the current control element may be replaced with a field effect transistor to obtain the similar effect, while the constant current source 36 may be abbreviated depending on the cases.

Figure 5:
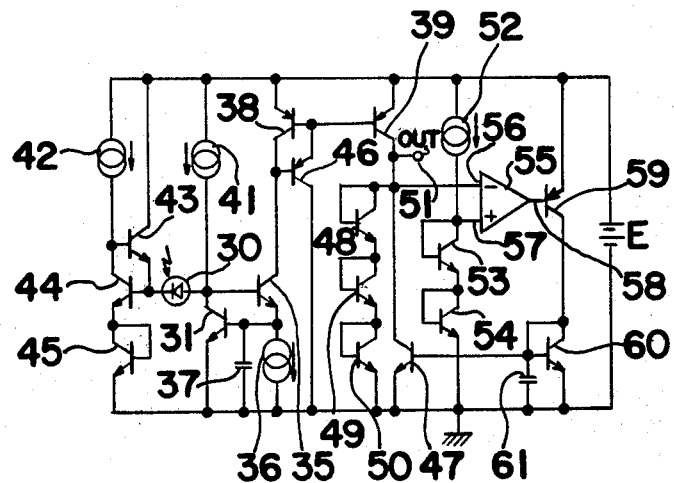
FIG. 5 is a diagram similar to FIG. 4, which particularly shows a modification thereof.

Referring to FIG. 5, there is shown one specific embodiment of the voltage signal conversion circuit in which the photoelectric conversion circuit of FIG. 4 is constituted into an electrical circuit suitable for a semiconductor integrated circuit. In the circuit of FIG. 5, the transistor 35 and capacitor 37 constituting the second current circuit are simultaneously used for the buffer circuit 33 and capacitor 34 in FIG. 4 respectively. More specifically, the base of the transistor 35 is in a state subjected to a negative feedback through the transistor 31, and by the function of this negative feedback, the base of the transistor 31 comes to be biased by a voltage just required for turning the photo current into the collector current. The cathode of the photoelectric element 30 is connected to the base of a transistor 44 which is the output of a constant circuit constituted by a constant current source 42, transistors 43, 44 and 45. Between the base and ground connection of the transistor 44, the sum of the base-emitter voltage of each of the two transistors 44 and 45 is developed as a constant voltage. Meanwhile, between the anode and ground connection of the photoelectric element 30, the sum of the base-emitter current of each of the two transistors 31 and 35 is developed. Both of the voltages as described above are generally equal to each other, and therefore, since any potential difference across the photoelectric element, even if present, is small in its value, it may be regarded that a short-circuit current is developed as an output from the photoelectric element 30. The base and collector of the transistor 38 is connected through the emitter and base of a transistor 46. To the collector of the transistor 39, a transistor 47 forming a first load, and a series circuit of these transistors 48, 49 and 50 connected for the diode connection to constitute a logarithmic compression circuit and forming a second load, are connected as loads.

Meanwhile, the collector of the transistor 39 forming a signal output terminal is connected with the inversion input terminal 56 of an operational amplifier 55. The other input terminal 57 of the operational amplifier 55 is connected to a junction of a constant current source 52 forming a reference voltage source and the collector of the transistor 53, while at said junction, a constant voltage 2 VBE equivalent to two base-emitter voltages VBE of the transistor is produced by the constant current source 52 and two transistors 53 and 54 connected for the diode connection. The output terminal 58 of the operational amplifier 55 is connected to the base of the transistor 59, while a transistor 60 of the diode connection is coupled between the collector and ground connection of said transistor 59. Furthermore, a capacitor 61 is connected in parallel with the transistor 60, the base of which is connected with the base of a transistor 47, and thus, the signal output terminal 51 is applied with a negative feedback through the operational amplifier 55, and transistors 59, 60 and 47.

In the circuit of FIG. 5 constructed as described above, a study will first be made with reference to the case where only the standing light is incident upon the photoelectric element 30. In the above case, the photoelectric current developed by the photoelectric element 30 and the dummy current by the current source 41, excepting the portion thereof becoming the base current of the transistor 35, flow through the transistor 31 as the collector current thereof. Meanwhile, the constant current by the current source 36 is caused to be flowing through the collector of the transistor 35, and the capacitor 37 is charged by the base-emitter voltage corresponding to the collector current of the transistor 31. In the steady state as described above, the collector current of the transistor 39 is constant, and is equal to the collector current of the transistor 35 when the transistors 38 and 39 are equal to each other in configuration and characteristics, but if a difference is provided in the emitter area of the both transistors, the collector current corresponds to the area ratio thereof. In the case where the collector current of the transistor 39 is constant, the voltage between the signal output terminal 51 and the ground becomes equal to the voltage between the non-inversion input terminal 57 and the ground or the base-emitter voltages 2 VBE by the two transistors 53 and 54 connected in series, i.e. the reference voltage by the negative feedback function of the operational amplifier 55. In the above case, most of the constant collector current from the transistor 39 flows in the form of the collector current of the transistor 47. Since the voltage between the output terminal 51 and ground is now maintained at 2 VBE, this voltage 2 VBE is to be applied to the series circuit including the three transistors 48, 49 and 50. In other words, a voltage of ⅔ VBE is impressed between the base and emitter of each one of said transistors. Here, on the assumption that the voltage VBE=540 mV, the voltage applied to each of the transistors 48, 49 and 50 becomes 360 mV which is smaller than the voltage VBE by 180 mV. The collector current of a transistor varies by approximately 1000 with respect to the variation of 180 mV of the base-emitter voltage due to the logarithmic characteristics thereof. Such being the case, in the steady state, only about 1/1000 of the current flowing through the series circuit of the transistors 53 and 54 is caused to flow through the series circuit of the transistors 48, 49 and 50 which form the second load. For example, if the current flowing through the series circuit of the transistors 53 and 54 and the collector current of the transistor 47 are both 4 μA, the current flowing through the transistors 48, 49 and 50 which are the second load will be approximately 4 nA.

Subsequently, the function in the case where the signal light enters the photoelectric element in addition to the standing light will be described hereinbelow.

The transistor 31 is biased at its base so as to cause only the constant collector current with respect to the standing light to flow. Therefore, the increased portion of the photo current with respect to the incidence of the signal light to the photoelectric element 30 flows into the base of the transistor 35 in the similar manner as in the case of FIG. 4. The above photoelectric current corresponding to the signal light having flowed into the base is amplified by the transistor 35 so as to be converted into the collector current of the transistor 39. With respect to the rapidly increased portion of the collector current of the transistor 39, the transistor 47 shows an extremely high resistance in the similar manner as in the case of the transistor 31, which is provided by the base-emitter circuit of the transistor 47 owing to the delay function of the capacitor 61. Therefore, the increased portion of the collector current flows into the series circuit of the transistors 48, 49 and 50 which are the second load. Since said second load is of the diode load, the voltage across the second load is proportional with the logarithm of the supplied current. In other words, voltage subjected to the logarithmic compression is developed across the terminals of the load. Here, a quantitative study will be made as to how much voltage signal is produced by the second load with respect to the incidence of signal light. On the assumption that the current value of the constant current source 36 is 0.4 μA, and the current amplification factor hFE of the transistor 35 is 100, with the emitter area of the transistor 39 being set to be larger than that of the transistor 38 by 10 times, the collector current of the transistor 39 becomes 4 μA, which is ten times the collector current (0.4 μA) of the transistor 38, while the base current of the transistor 38 becomes 4 nA. In connection with the above, the current value of the constant current source 41 may be set at a value larger than 4 nA. On the other hand, the transistors 48, 49 and 50 constituting the second load and the transistors 53 and 54 forming the constant voltage source are set to have equal configuration and characteristics to each other, with a voltage of 540 mV being developed from the constant voltage source. In this case, the current of 4 nA is to flow through the second load as described previously. Now, on the supposition that signal light is incident upon the photoelectric element 30, with a corresponding photoelectric current of 100 PA being produced, this photoelectric current flows into the base of the transistor 35 as mentioned earlier so as to be multiplied by 100 at the transistor 35 and further by 10 at the transistor 39 for being amplified to 100 nA and developed at the collector of the transistor 39. The above collector current of 100 nA is caused to flow through the second load. Since the current of 4 nA was flowing through the second load in the state prior to the incidence of signal light, the increase of current in said load is of 25 times. Generally, the base-emitter voltage is increased by 18 mV (at an ambient temperature of 25° C.) with respect to 2 times increase of the collector current of a transistor, and therefore, an increase of approximately 83 mV is expected per one transistor with respect to the increase of the collector current by 25 times, and thus, an increase of about 250 mV is observed in the second load on the whole. In the manner as described above, the signal light equivalent to the photoelectric current of 100 PA has been converted into the voltage of 250 mV. Subsequently, upon consideration of a case where the photoelectric current owing to the signal light is of 100 nA (i.e. 1,000 times that in the case mentioned above), the current flowing into the second load becomes 100 μA, which is equivalent to the increase of 2500 times. Accordingly, a voltage signal increased by about 610 mV is developed as output from the second load. Described so far is the function for converting the signal light into voltage signal corresponding to its intensity. It will be clear that the voltage signal developed from the terminal 51 is formed into impulse-like waveform even when the signal light is in a stepped form. Therefore, the signal light may be of single light emission of impulse form also from the viewpoint of energy saving of the light source.

As described in detail in the foregoing, when the photoelectric conversion circuit of FIG. 5 is employed, the signal light may be separated from the standing light for detection over a wide range of brightness region of the standing light. It is to be noted that, in the embodiment of FIG. 5, the transistors 48, 49 and 50 having the function of the second load may be replaced by a diode 48' connected between the collectors of the transistors 39 and 53 as shown in FIG. 11. In the above case, however, the value of the constant current of the constant current source 52 is set to be sufficiently larger than the current value corresponding to the signal light and developed from the transistor 39 for maintaining the collector potential of the transistor 53 constant. Meanwhile, in FIG. 5, the circuit structure, in which the collector of the PNP transistor 39 is connected to the collector of the NPN transistor 47 which forms one of the loads of the transistor 39, may be modified as in FIG. 12 by addition of two transistors 39' and 47' which are coupled with the transistors 39 and 47 respectively as shown. In both of the above structures, the collector characteristics of the transistor forming the first load are utilized.

Furthermore, the circuit construction of FIG. 5 may be further modified as in the arrangement of FIG. 15 in which the emitter of the transistor 35 is not directly connected to the base of the transistor 31, but is indirectly coupled thereto through a circuit including a transistor 35' and a constant current source 37'. In the above case, if another capacitor is connected in parallel with the constant current source 37', a still more positive delay effect can be expected. As is seen from the above description, the emitter of the input transistor 35 need not necessarily be directly connected to the base of the transistor 31 which is a current control element, but may be functionally connected as in FIG. 15. It is to be noted here that in FIG. 15, a transistor 45' connected for diode connection has been added for balancing with respect to the transistor 35' also added as mentioned earlier.

Figure 6:
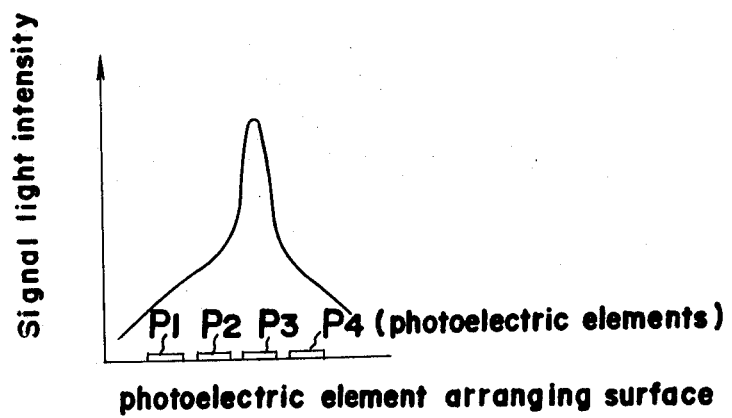
FIG. 6 is a diagram showing the distribution of intensities of incident light for the photoelectric elements, FIG. 7($a$) is a diagram showing the relation between the output signal of the photoelectric conversion circuit and reference voltage, FIG. 7($b$) is an electrical block diagram showing the principle of structure of a reference voltage generation circuit, FIGS. 8($a$) and 8($b$) are fragmentary block diagrams explanatory of known circuit constructions for obtaining characteristics close to an ideal diode.

Incidentally, in terms of principle, it is possible to detect the distance, if the photoelectric conversion circuit as described with reference to FIG. 5 is applied to the blocks 13, 14, 15 and 16 of FIG. 2, but for the practical applications, there still remain some problems to be solved. More specifically, even on the assumption that the light beam to be emitted is sufficiently narrow to be ideal and the image with respect to "bright region" on the object projected by such light beam is formed on the particular one of the photoelectric elements corresponding to the distance up to the object as shown in FIG. 6 from the viewpoint of geometrical optics, the light component from the "bright region" is undesirably received simultaneously by the other photoelectric elements in the actual practice. The inconvenience as described above is attributable to the fact that the signal light incident upon a particular photoelectric element for the image formation is reflected on the light receiving surface of the photoelectric element, with the reflected light being further reflected on the surface of the image forming lens, thus resulting in the internal reflection in a housing in which the photoelectric elements are provided. Furthermore, as shown in FIG. 3, in the actual light beam, the cross sectional area thereof varies according to the distances, with further variations in the state of light distribution, and the component arising from aberrations of the projecting lens 2 is added, and thus, the actual light beam is deviated considerably from the ideal one. Moreover, the image forming lens 4 forms a sharp image only with respect to the object located at the specific distance. Such being the case, it is inevitable that the signal light is incident not only upon the particular photoelectric element corresponding to the distance up to the object, but also undesirably upon other photoelectric elements. In the distribution of the incident light intensities on the surfaces of the arranged photoelectric elements, although the signal light is incident, for example, upon the photoelectric element P3 as shown in FIG. 6, such signal light also enters the remaining three photoelectric elements P1, P2 and P4. Therefore, it is seen that the distance can not be detected by merely detecting whether the signal light has entered the respective photoelectric elements or not. Accordingly, it may suit the purpose, for example, if the level of the reference voltage source 25 for the voltage comparison in FIG. 2 is properly set so as to discriminate the output signal of the photoelectric conversion circuit including the photoelectric element P3 from that of the other photoelectric conversion circuits for detecting that the signal light is incident upon the photoelectric element P3 in FIG. 6. However, since the intensity of the signal light varies in various ways depending on the distances up to the objects and their reflectances, proper judgement can not be effected if the level of the reference voltage source 25 is fixed. Accordingly, it is conceived to vary the reference voltage level according to the intensity of the signal light for the detection of the distance signal aimed at.

Subsequently, the reference voltage varying circuit arranged to alter the reference voltage level according to the intensities of the signal light and the range finder employing said circuit will be described.

Figure 7A:
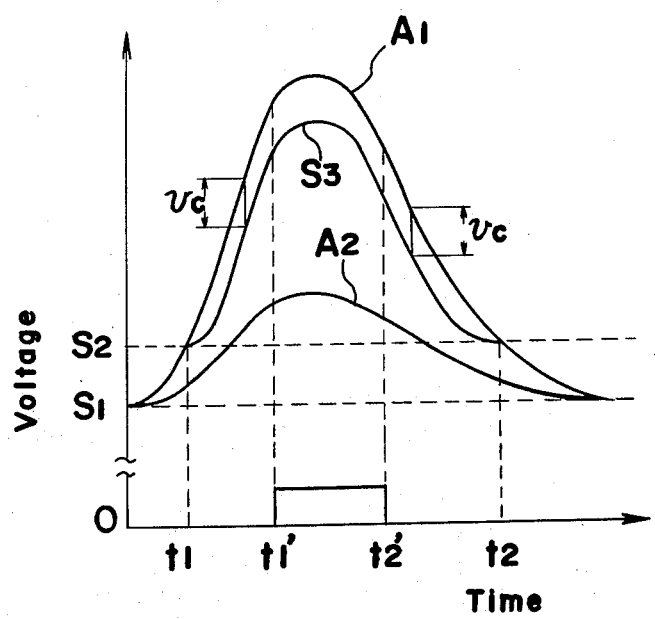

Referring to FIG. 7(a) showing the relation between the output signals of the photoelectric conversion circuit and reference voltage, a waveform A1 represents the output signal of the photoelectric conversion circuit subjected to the brightest signal light, while a waveform A2 shows one of the output signals of other photoelectric conversion circuits. The voltage level S1 is equivalent to the collector potential of the transistor 53 in the circuit of FIG. 5, and also to the output level of the respective photoelectric conversion circuits in the steady state, while the voltage level S2 is a predetermined reference level which is set at a level higher than the upper level the sum of the amplitude component of noise contained in the output of the respective photoelectric conversion circuits and the voltage level S1 in the steady state. The voltage signal S3 is the reference voltage aimed at here which is varied according to the signal light. This reference voltage S3 is produced by employing the output signal A1 which first reaches the voltage level S2 in the outputs of the respective photoelectric conversion circuits as described later.

Figure 7B:
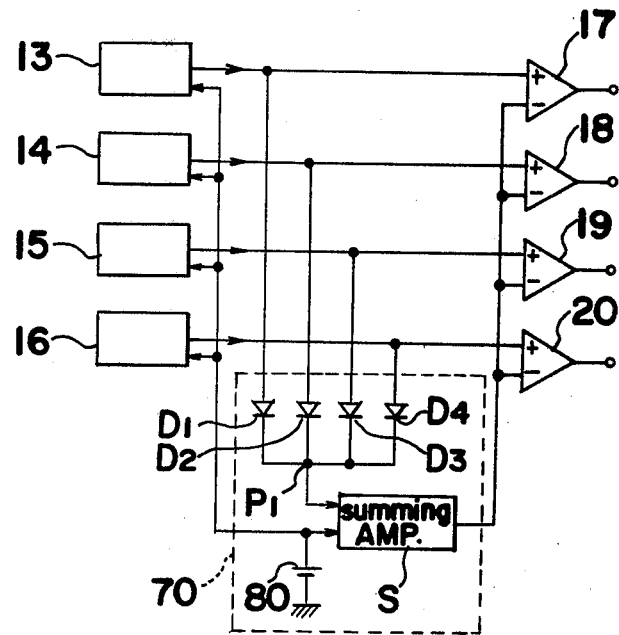

Referring also to FIG. 7(b), there is shown an electrical block diagram explanatory of the principle of a reference voltage generation or varying circuit 70 for developing the reference voltage S3. In FIG. 7(b), to the respective output terminals of the photoelectric conversion circuits 13, 14, 15 and 16, there are connected the anodes of diodes D1, D2, D3 and D4 whose cathodes are commonly connected to each other. The common junction P1 of the diodes D1 to D4 is coupled to one of the inputs of a summing amplifier S, while the other input of the summing amplifier S is connected with a constant voltage source 80. The summing amplifier S whose output is connected to one of the inputs of the respective voltage comparators 17 to 20 develops voltage responsive to the voltage level at junction P1. Now, on the assumption that the diodes D1, D2, D3 and D4 are of ideal diodes having impedance of zero in the forward direction and of infinity in the reverse direction, the voltage level at the junction P1 becomes equal to the voltage of the largest level in the outputs of the respective photoelectric conversion circuits 13, 14, 15 and 16. Therefore, the output from the summing amplifier S, i.e. the reference voltage to be given to one of the inputs of each of the voltage comparators 17 to 20 is to correspond to the largest voltage in the outputs of the respective photoelectric conversion circuits 13, 14, 15 and 16. Here, under the steady state where there is no light beam is emitted, with only the ambient light having a constant brightness being incident upon the photoelectric elements included in the respective photoelectric conversion circuits, it is so arranged that the output levels of said respective photoelectric conversion circuits become equal to the output level of the constant voltage source 80. The above arrangement can be achieved by commonly utilizing a constant voltage produced between terminals of a series circuit of the transistors 53 and 54 in the circuit of FIG. 5 as the constant voltage source 80. Moreover, in the steady state, the summing amplifier S is arranged to develop a voltage having a level higher than the output level of the constant voltage source 80 by a predetermined voltage (this is achieved by imparting threshold level to the respective voltage comparators). Additionally, when light beam is emitted and voltage signals corresponding thereto are developed from the plurality of the photoelectric conversion circuits 13, 14, 15 and 16, reference voltage corresponding to the voltage having the highest level thereof is developed from the summing amplifier S, and in the above case, the summing amplifier S is so arranged that the reference voltage S3 is lower than the above voltage signal A1 having the highest level as shown in FIG. 7(a).

Figure 8A:
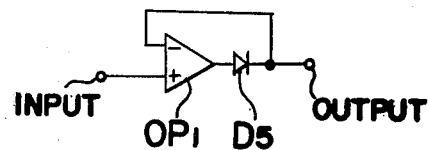
Figure 8B:
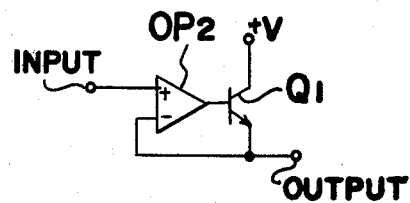

Referring to FIGS. 8(a) and 8(b), there are shown known circuit constructions for achieving characteristics close to those of the ideal diode. In FIG. 8(a), an operational amplifier OP1 and a diode 5 coupled to the output of the amplifier OP1 are employed, while in FIG. 8(b), an operational amplifier OP2 and a transistor Q1 connected to the output of the amplifier OP2 at its base are used. The respective diodes D1 to D4 in the circuit 70 of FIG. 7(b) may be replaced by the circuit construction in FIG. 8(a) or 8(b) as described above.

Figure 9:
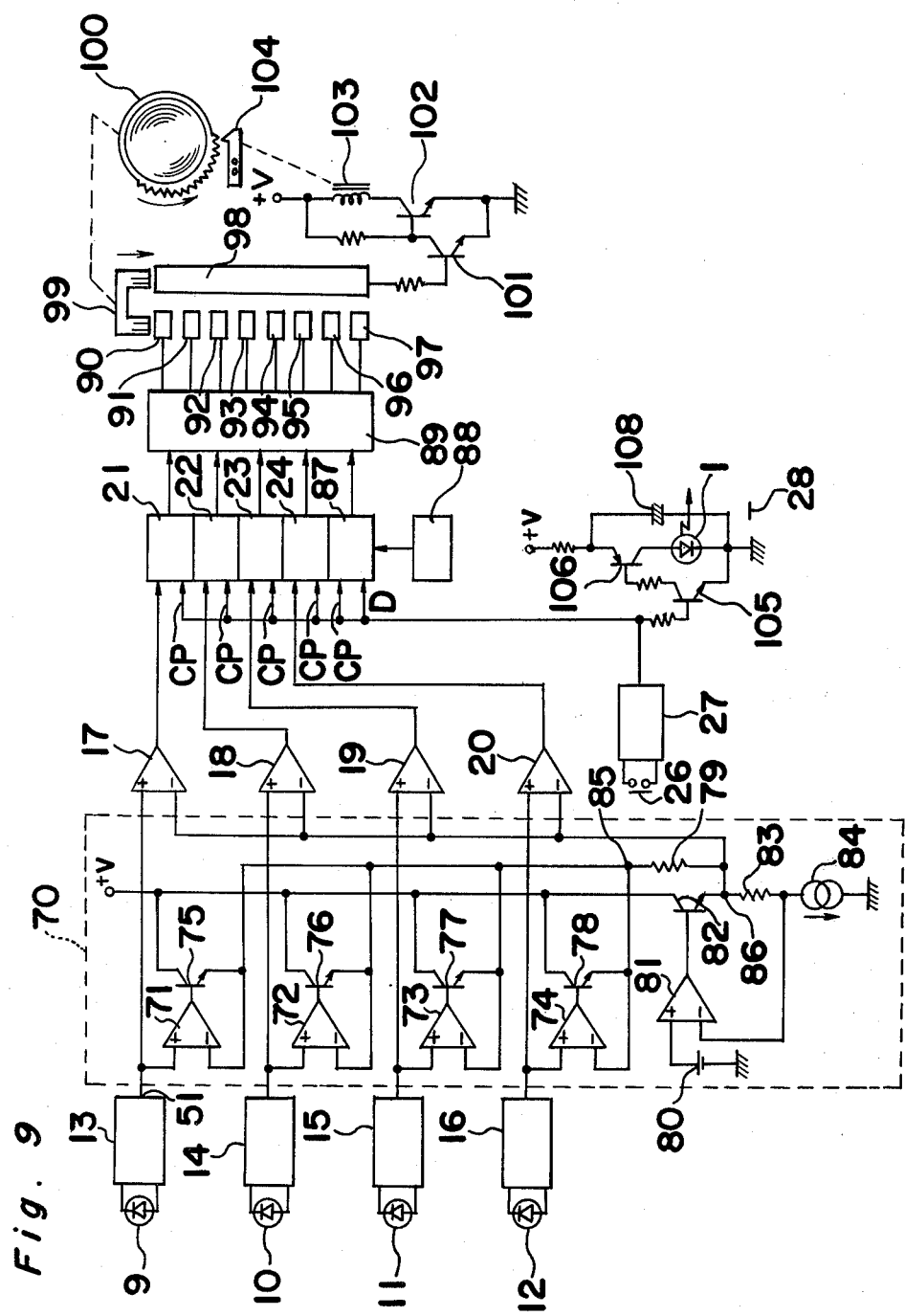
FIG. 9 shows an electrical block diagram of an automatic focusing apparatus according to the present invention in which the circuit of FIG. 8($b$) is incorporated.

Referring to FIG. 9, showing a general circuit construction of an automatic focusing arrangement, one preferred embodiment of the reference voltage varying circuit for generating the reference voltage S3 will be described hereinbelow. It is to be noted that in FIG. 9, the circuit portion 70 surrounded by the dotted lines constitutes the above reference voltage varying circuit, and that in said circuit portion 70, the circuit as described with reference to FIG. 8(b) has been employed.

In the reference voltage varying circuit 70 in FIG. 9, non-inversion input terminals of operational amplifiers 71, 72, 73 and 74 are respectively connected to the corresponding outputs of the photoelectric conversion circuits 13, 14, 15 and 16. For these photoelectric conversion circuits 13, 14, 15 and 16, the circuit described with reference to FIG. 5 has been employed. Meanwhile, the output terminals of the operational amplifiers 71, 72, 73 and 74 are respectively connected to the bases of the transistors 75, 76, 77 and 78 whose collectors are connected to the positive terminal of the power source. The emitters of the transistors 75, 76, 77 and 78 are respectively connected to the inversion input terminals of the operational amplifiers 71, 72, 73 and 74, and also commonly connected with one end 85 of a resistor 79. The other end of the resistor 79 is connected to a junction 86 between the emitter of a transistor 82 and a resistor 83, and the junction 86 is further connected to the respective inversion input terminals of the voltage comparators 17, 18, 19 and 20. The other end of the resistor 83 is coupled to the constant current source 84, and also to the inversion input terminal of an operational amplifier 81. The non-inversion input terminal of the operational amplifier 81 is connected to the constant voltage source 80, while the output terminal thereof is connected to the base of the transistor 82. Here, for the constant voltage source 80, the constant voltage source constituted by the constant current source 52 and the transistors 53 and 54 in the photoelectric conversion circuit of FIG. 5 is simultaneously used. Accordingly, the voltage level applied to the non-inversion input of the operational amplifier 81 by the constant voltage source 80 is equal to the level S1 in the graph of FIG. 7(a). It is to be noted here that the resistor 79 may be replaced by divided resistors 79' connected to the respective inversion input terminals of the voltage comparators 17, 18, 19 and 20 for altering respective levels as shown in FIG. 14.

In the functioning of the reference voltage varying circuit 70, although in the circuit arrangement of FIG. 2, the constant voltage by the constant voltage source 25 is applied as the comparison reference voltage for the voltage comparison circuits 17, 18, 19 and 20, in the circuit arrangement of FIG. 9, the voltage varying with time and corresponding to the output signal of the photoelectric conversion circuit upon which the signal light having the largest intensity is incident is given by the reference voltage varying circuit 70.

In the arrangement of FIG. 9, a study will first be made with reference to the case where only the standing light is entering. In such a case, the photoelectric conversion circuit is developing the voltage having the level S1 in the graph of FIG. 7(a). On the other hand, since the voltage of the level S1 is applied also to the non-inversion input of the operational amplifier 81, the inversion input of said operational amplifier 81 is also maintained at the level S1 by the action of the negative feedback through the transistor 82 and resistor 83. Therefore, at the junction 85, there appears a voltage having the level S2 which is higher than the level S1 by a voltage drop at the resistor 83 owing to the current of the constant current source 84, and the above voltage having the level S2 is applied to the respective inversion input terminals of the operational amplifiers 71, 72, 73 and 74 and the voltage comparison circuits 17, 18, 19 and 20. Accordingly, the output terminals of these operational amplifiers 71 to 74 and voltage comparison circuits 17 to 20 are all developing voltages at "low" level, with the transistors 75, 76, 77 and 78 being in a cut-off state. Such being the case, no current is flowing through the resistor 79, with the junctions being maintained at the same potential S2.

Subsequently, description will be given concerning the functioning in the case where voltage signals corresponding to the signal light are developed from the photoelectric conversion circuit. On the assumption, for example, that voltage signal first reaching the level S2 as in the waveform A1 in the graph of FIG. 7(a) is developed from the photoelectric conversion circuit 14, the waveform A1 is initially at the level S1 and rises with the incidence of the signal light. When the waveform A1 reaches the level S2, the output of the operational circuit 72 which is in the state of "low" level up to that time starts to be directed toward "high" level, and the base of the transistor 76 comes to be subjected to the forward biasing. In the manner as described above, the operational amplifier 72 becomes capable of effecting the negative feedback function through the transistor 76, and the voltage level of the inversion input terminal thereof varies to equally follow the output voltage of its non-inversion input terminal and consequently, the output voltage A1 of the photoelectric conversion circuit 14. Since the inversion inputs of the operational amplifiers 71, 72, 73 and 74 are at the potential common to each other, the inversion inputs are still higher in the voltage level than the non-inversion inputs under the above state except for the operational amplifier 72, with the transistors 75, 77 and 78 being held in the cut-off state. Thus, the voltage level at the junction 85 moves to follow the output voltage waveform A1, during the period t1 to t2 in which the output voltage of the photoelectric conversion circuit 14 is higher than the level S2. When the waveform A1 comes to exceed the level S2, the emitter current of the transistor 76 subjected to the forward bias flows into the constant current source 84 through the resistors 79 and 83. Consequently, the inversion input of the operational amplifier 81 comes to be raised up to a voltage level higher than the level S1, and the operational amplifier 81 develops voltage at "low" level. In such a manner, the transistor 82 is held in a cut-off state, and from the junction 85, there is developed the voltage signal S3 which is lower than the voltage level of the point 84 by a constant voltage vc (FIG. 7(a)) equivalent to the product of the resistance value of the resistor 79 and the constant current value of the constant current source 84. The voltage signal S3 is applied to the inversion inputs of the voltage comparison circuits 17, 18, 19 and 20 as the comparison reference voltage, on the basis of which the magnitudes of the respective output signals of the photoelectric conversion circuits are compared and detected.

In the manner as described above, during the period from t1 to t2 (FIG. 7(a)), the voltage of "high" level, i.e. level "1" is developed from the voltage comparison circuit 18 in the above embodiment. If the output signal developed from the circuit other than the photoelectric conversion circuit 14 is one as shown by the waveform A2 in FIG. 7(a) or one having the level lower than that, voltage with "low" level, i.e. level "0" is output from the voltage comparison circuits 17, 19 and 20. Although the function as described above is related to the case where the output of the photoelectric conversion circuit 14 is comparatively large as compared with that of others, similar function may apply to the output of any of the photoelectric conversion circuits. It is to be noted here that in the case, for example, where the main portion of the signal light is directed toward an intermediate portion between the neighboring photoelectric conversion elements, both of the outputs of the photoelectric conversion circuits corresponding to these photoelectric elements will simultaneously become higher than the level of the selecting voltage S3. Meanwhile, depending on the state of intensity distribution of signal light on the arranged surfaces of the photoelectric elements, there may arise a case where three outputs of the photoelectric conversion circuits simultaneously exceed the discriminating level. It may be so arranged that, for achieving still more positive functioning, gate pulses as shown by the period t'1 to t'2 in FIG. 7(a) are developed after a predetermined period has elapsed from the starting of emitting of light, whereby only during the time period in which these pulses are present, the output resulting from the comparison between the reference voltage S3 and the respective outputs of the photoelectric conversion circuits can be taken into the register 21.

Subsequent to the functions of the reference voltage varying circuit 70 as described in the foregoing, functions of the entire circuit arrangement of FIG. 9 will be described hereinbelow.

On the supposition that the circuit arrangement of FIG. 9 is in the state where preparation for the functioning has been completed, with the power from the power source being supplied to various parts of the circuits, the capacitor 108 for storing light emitting energy of the light emitting diode 1 is charged up to the power source voltage through a resistance. In response to the closing of the switch 26, with the optical axis of the light projection lens 2 directed to the subject for photographing, voltage signal of "high" level (level "1") is developed only for a predetermined period of time from the one shot multivibrator circuit 27. By the above voltage signal, transistors 105 and 106 are rendered conductive, and the charge of the capacitor 108 is discharged at once through the transistor 106 and light emitting diode 1, and thus, light beam in the form of impulses is projected toward the subject to be photographed. Simultaneously, the signal of level "1" from the one-shot circuit 27 is applied to the inputs CP of the registers 21, 22, 23, 24 and 87 and the input D of the register 87. A reset pulse generation circuit 88 is coupled to the registers 21, 22, 23, 24 and 87 to generate reset pulses for resetting these registers upon closing of a power switch (not shown), etc. When such registers are reset, the output thereof is brought into the state of "0". Upon emitting of the light beam, the signal of "1" is developed from any one or neighboring two or three of the voltage comparison circuits 17, 18, 19 and 20, although there may be cases where no signal of "1" is developed depending on the subject to be photographed. In the registers 21, 22, 23, 24 and 87, when "1" is simultaneously applied to the two inputs D and CP, the output is set to be "1", and even when the input becomes "0" thereafter, the state of output "1" is maintained until resetting or cutting off the power supply. It is to be noted that each of the registers is constituted by employing an AND gate and an R-S flip-flop as shown in FIG. 13. Now, when the signal of "1" is developed from the voltage comparison circuit 18, the output of the register 22 is set to be in the state of "1" by the above signal and also the signal of "1" from the one shot circuit 27. In this case, the register 87 is simultaneously set to "1" and thus, emitting of the light beam is recorded. The signals from the group of the registers are converted, for example, into output signals corresponding to a short distance or a long distance as shown in FIG. 10 by a decoder 89. A photographing lens 100 is retracted, for example, from the most closed-up position to a position for infinity, and in association with the above functioning, a brush 99 is caused to slide over, for example, eight contact terminals 90, 91, 92, 93, 94, 95, 96, 97 and a contact terminal 98. When the brush 99 is positioned on the contact terminal developing "1", for example, on the contact terminal 92, the transistor 101 is rendered conductive by the base current flowing through the brush 99 and the contact terminal 98. By the above conduction, a transistor 102 is cut off, with de-energization of an electromagnet 103, and a stopper lever 104 is actuated to stop the retracting function of the lens 100. In the manner as described above, the photographing lens 100 is automatically adjusted for distance to a position corresponding to the distance information thus detected. As is seen from the foregoing description, practical application of the range finder of light beam projection system has been made possible by the introduction of the reference voltage varying circuit, with a remarkable effect.

As is clear from the foregoing description, according to one preferred embodiment of the present invention, the range finder system comprises light beam projection means for projecting light beam toward a subject to be measured for distance, an image forming optical system disposed at a position spaced a predetermined base length from said light beam projection means in such a manner that the optical axis of said optical system is selectively in parallel to or approximately parallel to an optical axis of said light beam projecting means, a plurality of photoelectric elements so arranged, on an image surface of said image forming optical system, as to receive the light beam selectively reflected from the subject according to distances up to said subject current output circuit means for developing current corresponding to the reflected light of light beam selectively incident upon one or plurality of said photoelectric elements, photoelectric conversion circuit means or current voltage conversion circuit means for converting photoelectric outputs or output current of said current output circuit means into voltage signals corresponding thereto, and voltage comparison circuit means for comparing output voltages of said photoelectric conversion circuit means with reference voltages, said range finder system further including reference voltage varying circuit means arranged to alter the levels of said reference voltage applied to said voltage comparison circuit means according to the outputs of said photoelectric conversion circuit means which receives reflected light of the maximum intensity from said subject resulting from said light beam.

In the above arrangement, since it is so arranged that the comparison level of the voltage comparison circuit is altered according to the photoelectric conversion output of the photoelectric conversion circuit including the photoelectric element which has received the brightest signal light so as to detect the significant signal light and to exclude the insignificant signal light, even if the reflected light enters the photoelectric elements other than the particular photoelectric element which should receive the reflected light, it has become possible to correctly detect the required distance.

Moreover, in another embodiment of the present invention, the range finder system which is arranged to receive reflected light of light beam in the form of pulses projected from light beam projection means to a subject to be measured for distance, selectively by any one of a plurality of photoelectric elements according to the distances thereof so as to detect the distance up to said subject through analysis of photoelectric current output of said photoelectric elements, includes photoelectric conversion circuit means connected to each of said photoelectric elements and adapted to develop, in a steady state where light of a predetermined intensity is incident upon said photoelectric elements, a constant current irrespective of the intensity, and to develop, during incidence of light in the form of pulse thereupon, a current corresponding to the intensity of said incident light in the form of pulse in addition to said constant current, a first load including one transistor at least whose collector characteristics are utilized and connected to the output of said photoelectric conversion circuit means as the load, negative feedback amplification circuit means connected, at its input, to a junction between said photoelectric conversion circuit means and said first load, and also connected, at its output, to the base of said transistor, and further imparted with feedback amount holding characteristics, and a logarithmic compression element connected substantially in parallel with said first load and forming a second load, said range finder system further including photoelectric current-voltage conversion circuit so arranged, by bypassing current corresponding to the intensity of the incident light in the form of pulses developed from said photoelectric conversion circuit through said second load, as to cause voltage signal in the logarithmic relation with the current value to be developed from said second load.

By the above arrangement of the present invention, it is possible to treat the signals under the low voltage source, which is extremely advantageous in the actual applications.

Furthermore, in the further embodiment of the present invention, the range finder system which is also arranged to receive reflected light of light beam in the form of pulses projected from light beam projection means to a subject to be measured for distance, selectively by any one of a plurality of photoelectric elements according to the distances thereof so as to detect the distance up to said subject through analysis of photoelectric current output of said photoelectric elements, includes a current control element connected in series with each of said photoelectric elements, an input transistor which is connected at its base, to a junction between said photoelectric element and said current control element, and which is functionally connected at its emitter, to a control electrode of said current control element, and circuit means coupled to the emitter circuit of said input transistor and including a constant current source for causing a constant current to flow through the collector of said input transistor during a steady state period and a capacitor for suppressing a rapid fluctuation of the emitter potential of said input transistor, whereby according to intensities of the pulse-like light from said light beam projection means incident upon said photoelectric elements in addition to standing light, the photoelectric developed by the photoelectric elements is caused to flow into the base of said input transistor so as to derive current corresponding to the photoelectric current from the collector of said input transistor.

By the above arrangement according to the present invention, the momentary light can positively be detected by the simple circuit construction, with various advantages in the actual applications.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. An automatic range finder for a camera comprising:

means for projecting a pulse of light beam toward an object;

means kept apart from said projecting means by a predetermined base length for focusing the light beam reflected back from the object, the optical axis of said focusing means being substantially parallel with the path of the projected light beam;

means arranged on the focal plane of said focusing means for receiving the reflected light beam focused by said focusing means, said receiving means including a plurality of photosensitive elements aligned along the direction of the base length;

means connected to said photosensitive elements for detecting the relatively rapid changes in the individual currents generated by said photosensitive elements respectively to produce corresponding current outputs;

means connected to said detecting means for converting said current outputs into corresponding changes in voltages if any of said relatively rapid changes in the currents is detected respectively;

means for generating reference voltage levels;

means for comparing each of said voltage changes from said converting means with each of said reference voltage levels respectively;

means for producing a distance signal in response to said comparing means; and means for altering said reference voltage levels in response to said converting means by values determined by the greatest of said changes in voltages respectively.

2. An automatic range finder as claimed in claim 1, wherein said altering means comprises means for finding out said greatest change in voltage and means for determining said values, by which said reference voltage levels are altered in response to said finding means.

3. An automatic range finder as claimed in claim 2, wherein said determining means comprises means for setting the values less than said greatest change in voltage by predetermined amounts respectively.

4. An automatic range finder as claimed in claim 3, wherein said finding means comprises a plurality of circuit means connected to said converting means, said plurality of circuit means each having an input and an output terminals with the diode characteristic therebetween, said input terminals each receiving each of said changes in voltages, respectively, and said output terminals being commonly connected to a junction point, whereby said determining means determines said values in accordance with the voltage at said junction point.

5. An automatic range finder as claimed in claim 4, wherein said plurality of circuit means each comprises an operational amplifier having a first and second inputs and an output, and a transistor, the base of which is connected to the output of said operational amplifier, said first input serving as said input terminal of said circuit means and the emitter of said transmittor, which is connected to said second input, serving as said output terminal of said circuit means.

6. An automatic range finder as claimed in claim 3, wherein said converting means comprising logarithmic conversion circuits, each of which is for converting each of said relatively rapid changes in the currents into a corresponding voltage in the logarithmic relation with each change in the current respectively.

7. An automatic range finder as claimed in claim 6, wherein said logarithmic conversion circuits each comprise a semiconductor load for generating an output voltage in the logarithmic relation with a current flowing therethrough, said semiconductor load being capable of receiving the current from said detecting means, and means for controlling said current to bypass said semiconductor load for maintaining the output voltage generated by said semiconductor load at a predetermined value irrespective of relatively slow change in the current from said detecting means, whereby the output voltage generated by said semiconductor load changes from said predetermined value only when the current from said detecting means shows the relatively rapid change.

8. An automatic range finder as claimed in claim 7, wherein said controlling means comprises means for giving said predetermined value of the voltage to be generated by said semiconductor load, means for comparing said output voltage generated by said semiconductor load with said predetermined value of said giving means, means for absorbing the current from said detecting means for the current to partially bypass said semiconductor load in response to an output of said comparing means, and means for preventing said absorbing means from responding to a relatively rapid change in the output of said comparing means.

9. An automatic range finder as claimed in claim 6, wherein said logarithmic conversion circuits each comprise a semiconductor load for generating an output voltage in logarithmic relation with a current flowing therethrough, means connected in parallel with said semiconductor load for passing a current determined in accordance with the current from said detecting means without said relatively rapid change, said parallel connection of said semiconductor load and said passing means receiving said current from said detecting means, whereby the relatively rapid change in said current in excess of the current passed through said passing means flows through said semiconductor load to generate an output voltage which changes in the logarithmic relation with said relatively rapid change in said current.

10. An automatic range finder as claimed in claim 9, wherein said passing means comprises means having a control terminal and connected in parallel with said semiconductor load for flowing a current in accordance with the voltage at said control terminal, means for giving a predetermined voltage level, an operational amplifier having a first input responsive to the output voltage of said semiconductor load, a second input responsive to said predetermined voltage level and an output for controlling said control terminal of said flowing means by way of electric means for filtering out a relatively rapid change in the output of said operation amplifier.

11. An automatic range finder as claimed in claim 10, wherein said giving means comprises a series connection of diodes and means for providing said series connection with a constant current, and wherein said semiconductor load comprises a series connection of diodes, the number of which is greater than those of said giving means.

12. An automatic range finder as claimed in claim 3, wherein said detecting means includes circuit means connected to each of said photosensitive elements, respectively, each of said circuit means comprising an output transistor, the collector current of which is proportional to the current output of said detecting means, means for maintaining the base-emitter voltage of said output transistor at a predetermined value irrespective of the relatively slow change in current generated by said photosensitive element and means for introducing the relatively rapid change in the current generated by said photosensitive element into the base of said output transistor and for absorbing the relatively slow change in current generated by said photosensitive element.

13. An automatic range finder as claimed in claim 12, wherein said introducing and absorbing means comprises means having a first, second and third terminals for regulating the current flow between said first and second terminals in response to a voltage signal at said third terminal, said first terminal being connected to said photosensitive element; means for negatively feeding back only a relatively slow change in voltage at said first terminal to said third terminal, and wherein said maintaining means comprises a constant current source connected to the emitter of said output transistor and a bypath connected in parallel with said constant current source for introducing an alternating current component of the emitter current of said output transistor, the base of said output transistor being connected to a junction between said photosensitive element and said regulating means.

14. An automatic range finder as claimed in claim 13, wherein said negatively feeding back means is formed by way of the base-emitter junction of said output transistor, and wherein said bypath comprises a capacitor, whereby said capacitor functions to feed back only a relatively slow change in voltage at said first terminal to said third terminal.

15. An automatic range finder as claimed in claim 13, wherein said maintaining means comprises means for supplying the base of said output transistor with a constant current to participate in maintaining the base-emitter voltage of said output transistor at said predetermined value.

16. An automatic range finder as claimed in claim 3, wherein said detecting means includes a plurality of circuit means each connected to each of said photosensitive elements respectively, said circuit means each comprising a current regulator having a first, second and third terminals for controlling a current flow between said first and second terminals in response to the voltage at said third terminal, said first terminal being connected to said photosensitive element, a constant current source, a transistor having a base connected to a junction of said first terminal and said photosensitive element and an emitter connected to said constant current source, a feed back circuit formed between said first and third terminals for causing a change in the voltage at said first terminal in a negative direction to the change in the voltage at said third terminal, said feed back circuit including means for delaying the signal transmission through said feed back circuit, bypath circuit connected in parallel with said constant current source for introducing an alternating current component of the emitter current of said transistor, whereby said transistor outputs a constant collector current according to said constant current source when alternating current component is not included in the current output from said photosensitive element and outputs the constant collector current added to a change of current when a corresponding change is included in the current output from said photosensitive element.

17. An automatic range finder as claimed in claim 16, wherein said feed back circuit includes the base-emitter junction of said transistor with the emitter of said transistor functionally connected to said third terminal, and said bypath circuit includes a capacitor which also serves as said delaying means.

18. An automatic range finder as claimed in claim 17, wherein each of said circuit means further comprises a second constant current source connected in parallel with said photosensitive element for ensuring the normal operation of the circuit means even if no current is generated by said photosensitive element by effecting as if a current which is actually from said second current source, is generated from said photosensitive element.

19. An automatic range finder for a camera comprising:
- means for projecting a pulse of light beam toward an object;
- means kept apart from said projecting means by a predetermined base length for focusing the light beam reflected back from the object, the optical axis of said focusing means being substantially parallel with the path of the projected light beam;
- means arranged on the focal plane of said focusing means for receiving the reflected light beam focused by said focusing means, said receiving means including a plurality of photosensitive elements aligned along the direction of the base length;
- means connected to said photosensitive elements for detecting the individual currents generated by said photosensitive elements respectively to produce corresponding current outputs;
- means connected to said detecting means for converting said current outputs into corresponding voltage output respectively;
- means for generating reference voltage levels;
- means for comparing each of said voltage outputs from said converting means with each of said reference voltage levels respectively; and
- means for producing a distance signal in response to said comparing means, wherein said converting means comprising logarithmic conversion circuits, each of which is for converting each of said current output into a corresponding voltage in logarithmic relation with each of said current outputs respectively.

20. An automatic range finder as claimed in claim 19, wherein said logarithmic conversion circuits are each designed so as to convert only a relatively rapid change in the current output into a change in the voltage output in the logarithmic relation with said relatively rapid change in the current output.

21. An automatic range finder as claimed in claim 20, wherein said logarithmic conversion circuits each comprise a semiconductor load for generating an output voltage in logarithmic relation with a current flowing therethrough, means connected in parallel with said semiconductor load for passing a current determined in accordance with the current from said detecting means without said relatively rapid change, said parallel connection of said semiconductor load and said passing means receiving said current from said detecting means, whereby the relatively rapid change in said current in excess of the current passed through said passing means flows through said semiconductor load to generate an output voltage which changes in the logarithmic relation with the change in said current.

22. An automatic range finder as claimed in claim 21, wherein said passing means comprises means having a control terminal and connected in parallel with said semiconductor load for flowing a current in accordance with the voltage at said control terminal, means for giving a predetermined voltage level, an operation amplifier having a first input responsive to the output voltage of said semiconductor load, second input responsive to said predetermined voltage level and an output for controlling said control terminal of said flowing means by way of electric means for filtering out a relatively rapid change in the output of said operation amplifier.

23. An automatic range finder as claimed in claim 22, wherein said giving means comprises a series connection of diodes and means for flowing a constant current through said series connection, and wherein said semiconductor load comprises a series connection of diodes, the number of which is greater than those of said giving means.

24. An automatic range finder as claimed in claim 20, wherein said logarithmic conversion circuits each comprise a semiconductor load for generating an output voltage proportional to a current flowing therethrough, said semiconductor load being capable of receiving the current from said detecting means and means for controlling said current to bypass said semiconductor load for maintaining the output voltage generated by said semiconductor load at a predetermined value irrespective of a relatively slow change in the current from said detecting means, whereby the output voltage generated by said semiconductor load changed from said predetermined value only when the current from said detecting means shows the relatively rapid change.

25. An automatic range finder as claimed in claim 24, wherein said controlling means comprises means for giving said predetermined value of the voltage to be generated by said semiconductor load, means for comparing said output voltage generated by said semiconductor load with said predetermined value of said giving means, means for absorbing the current from said detecting means for the current to partially bypass said semiconductor load in response to an output of said comparing means, and means for preventing said absorbing means from responding to a sudden change in the output of said comparing means.

26. An automatic range finder for a camera comprising:
means for projecting a pulse of light beam toward an object;
means kept apart from said projecting means by a predetermined base length for focusing the light beam reflected from the object, the optical axis of said focusing means being substantially parallel with the path of the projected light beam;
means arranged on the focal plane of said focusing means for receiving the reflected light beam focused by said focusing means, said receiving means including a plurality of photosensitive elements aligned along the direction of the base length;
means connected to said photosensitive elements for detecting the relatively rapid changes in the individual currents generated by said photosensitive elements respectively to produce corresponding current outputs;
means connected to said detecting means for converting said current outputs into corresponding changes in voltages if any of said relatively rapid changes in the currents is detected respectively;
means for generating reference voltage levels;
means for comparing each of said voltage changes from said converting means with each of said reference voltage levels respectively; and
means for producing a distance signal in response to said comparing means, wherein said detecting means includes a plurality of circuit means each connected to each of said photosensitive elements respectively, said circuit means each comprising a current regulator having a first, second and third terminals for controlling a current flow between said first and second terminals in response to the voltage at said third terminal, said first terminal being connected to said photosensitive element, a constant current source, a transistor having a base connected to a junction of said first terminal and said photosensitive element and an emitter connected to said constant current source, a feed back circuit formed between said first and third terminals for causing a change in the voltage at said first terminal in a negative direction to the change in the voltage at said third terminal, said feed back circuit including means for delaying the signal transmission through said feed back circuit, bypath circuit connected in series with said constant current source of introducing an alternating current component of the emitter current of said transistor, whereby said transistor outputs a constant collector current according to said constant current source when alternating current component is not included in the current output from said photosensitive element, and outputs the constant collector current added to a change of current when a corresponding change is included in the current output from said photosensitive element.

27. An automatic range finder as claimed in claim 26, wherein said feed back circuit includes the base-emitter hunction of said transistor with the emitter of said tranistor functionally connected to said third terminal, and said bypath circuit includes a capacitor which also serves as said delaying means.

28. An automatic range finder as claimed in claim 27, wherein each of said circuit means further comprises a second constant current source connected in parallel with said photosensitive element for ensuring the normal operation of the circuit means even if no current is generated by said photosensitive element by effecting as if a current which is actually from said second current source, is generated from said photosensitive element.

29. An automatic range finder for a camera comprising:
means for projecting a pulse of light beam toward an object;
means kept apart from said projecting means by a predetermined base length for focusing the light beam reflected back from the object, the optical axis of said focusing means being substantially parallel with the path of the projected light beam;
means arranged on the focal plane of said focusing means for receiving the reflected light beam focused by said focusing means, said receiving means including a plurality of photosensitive elements aligned along the direction of the base length;
means connected to said photosensitive elements for detecting the relatively rapid changes in the individual currents generated by said photosensitive elements respectively to produce corresponding current outputs;
means connected to said detecting means for converting said current outputs into corresponding changes in voltages if any of said relatively rapid changes in the currents is detected respectively;

means for generating reference voltage levels;

means for comparing each of said changes in voltages from said converting means with each of said reference voltage levels respectively; and means for producing a distance signal in response to said comparing means, wherein said detecting means includes circuit means connected to each of said photosensitive elements respectively, each of said circuit means comprising an output transistor, the collector current of which is proportional to the current output of said detecting means, means for maintaining the base-emitter voltage of said output transistor at a predetermined value irrespective of the relatively slow change in current generated by said photosensitive element and means for introducing the relatively sudden change in the current generated by said photosensitive element into the base of said output transistor and for absorbing the relatively slow change in current generated by said photosensitive element.

30. A range finder system which comprises light beam projection means for projecting light beam toward a subject to be measured for distance, an image forming optical system disposed at a position spaced a predetermined base length from said light beam projection means in such a manner that the optical axis of said optical system is substantially parallel to an optical axis of said light beam projecting means, a plurality of photosensitive elements so arranged, on an image forming surface of said image forming optical system, as to receive the light beam selectively reflected from the subject according to distances up to said subject, current output circuit means for developing current corresponding to the reflected light of the light beam selectively incident upon one or the plurality of said photoelectric elements, conversion circuit means for converting photoelectric current outputs of said current output circuit means into voltage signals corresponding thereto, and voltage comparison circuit means for comparing output voltages of said conversion circuit means with reference voltages, said range finder system further including reference voltage varying circuit means arranged to alter levels of said reference voltages applied to said voltage comparison circuit means according to the outputs of said conversion circuit means which receives reflected light of the maximum intensity from said subject resulting from said light beam.

31. A range finder system as claimed in claim 30, wherein the maximum output of said photoelectric conversion circuit means is arranged to be lowered by a predetermined voltage at all times.

32. A range finder system as claimed in claim 30, wherein said reference voltages to be applied to said voltage comparison circuit means corresponding to the respective photoelectric elements are each arranged to be altered.

33. A range finder system which is arranged to receive reflected light of light beam in the form of a pulse projected from light beam projection means to a subject to be measured for distance, selectitvely by at least one of a plurality of photoelectric elements according to the distances thereof so as to detect the distance up to said subject through anaylsis of photoelectric current output of said photoelectric elements, said range finder system comprising conversion circuit means connected to each of said photoelectric elements and adapted to develop, in a steady state where light of a predetermined intensity is incident upon said photoelectric elements, a constant current irrespective of the intensity, and to develop during incidence of light in the form of pulse thereupon, a current corresponding to the intensity of said incident light in the form of pulse in addition to said constant current, a first load including one transistor at least whose collector is connected to the output of said conversion circuit means as the load, negative feedback amplification circuit means connected, at its input, to a junction between said photoelectric conversion circuit means and said first load, and also connected, at its output, to the base of said transistor, and further imparted with feedback amount holding characteristics, and a logarithmic compression element connected substantially in parallel with said first load and forming a second load, said range finder system further including current-voltage conversion circuit so arranged, by bypassing current corresponding to the intensity of the incident light in the form of pulses developed from said photoelectric conversion circuit through said second load, as to cause voltage signal in the logarithmic relation with the current value to be developed from said second load.

34. A range finder system as claimed in claim 33, wherein said second load is constituted by diode load.

35. A range finder system which is arranged to receive reflected light of light beam in the form of a pulse projected from light beam projection means to a subject to be measured for distance, selectively by at least one of a plurality of photoelectric elements according to the distances thereof so as to detect the distance up to said subject through analysis of photoelectric current output of said photoelectric elements, said range finder system comprising a current control element connected in series with each of said photoelectric elements, an input transistor which is connected at its base, to a junction between said photoelectric element and said current control element, and which is functionally connected at its emitter, to a control electrode of said current control element, and circuit means coupled to the emitter circuit of said input transistor and including a constant current source for causing a constant current to flow through the collector of said input transistor during a steady state period and a capacitor for suppressing a rapid fluctuation of the emitter potential of said input transistor, whereby according to intensities of the pulse-like light from said light beam projection means incident upon said photoelectric elements in addition to standing light, the photoelectric current developed by the photoelectric elements is caused to flow into the base of said input transistor so as to derive current corresponding to the photoelectric current from the collector of said input transistor.

36. A range finder system as claimed in claim 35, wherein each of said photoelectric elements is a photodiode, said current control element being a current control transistor whose collector is connected to the anode of said photodiode, with the emitter of said input transistor being connected to the base of said current control transistor.

* * * * *